No. 637,824. Patented Nov. 28, 1899.
J. G. PRATT.
MACHINE FOR TREATING FIBROUS PLANTS.
(Application filed Oct. 14, 1898.)
(No Model.) 4 Sheets—Sheet 1.
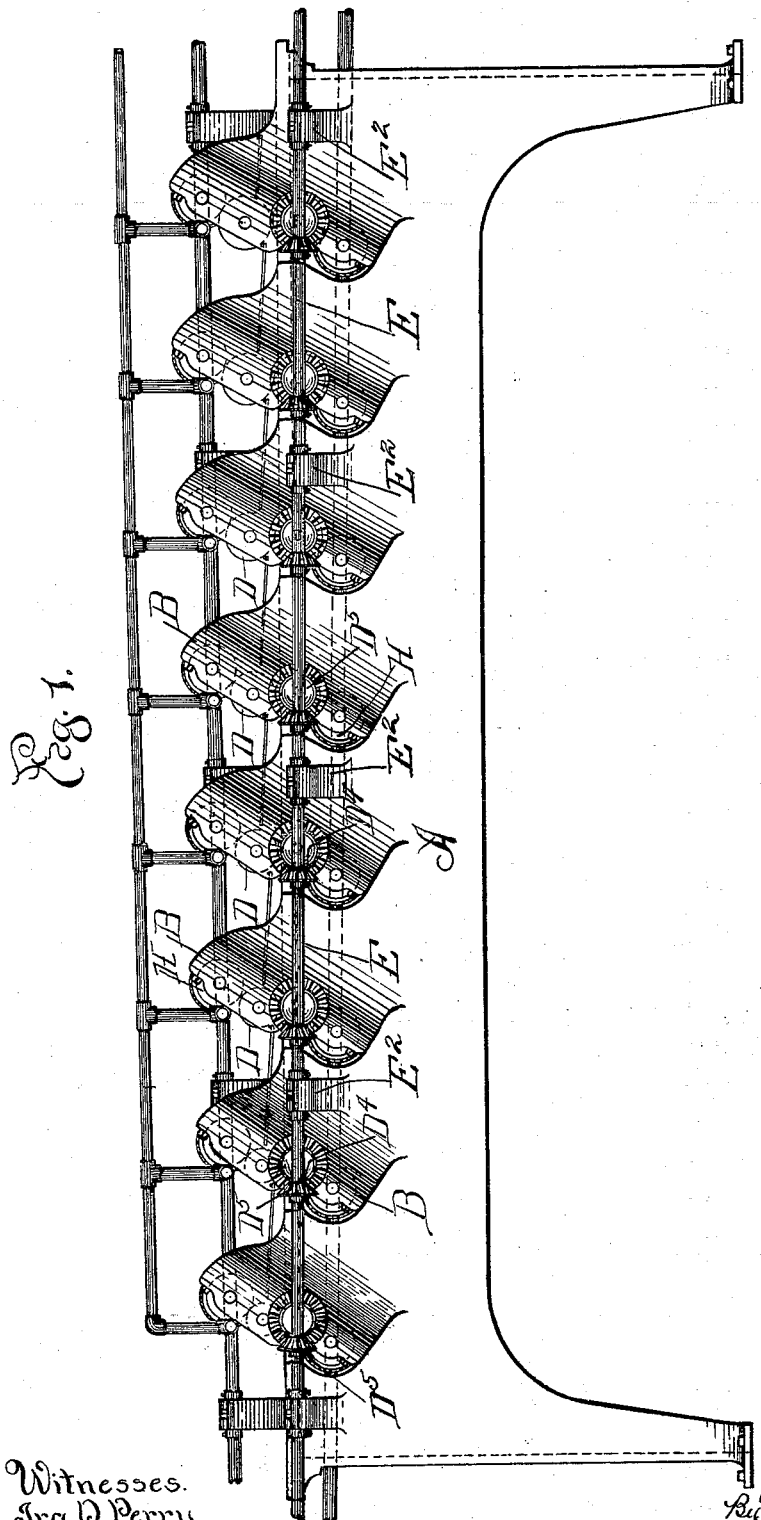
Witnesses.
Ira D. Perry.
R. Weir.
Inventor
Joseph G. Pratt,
By Chas. E. Buckley,
Atty.

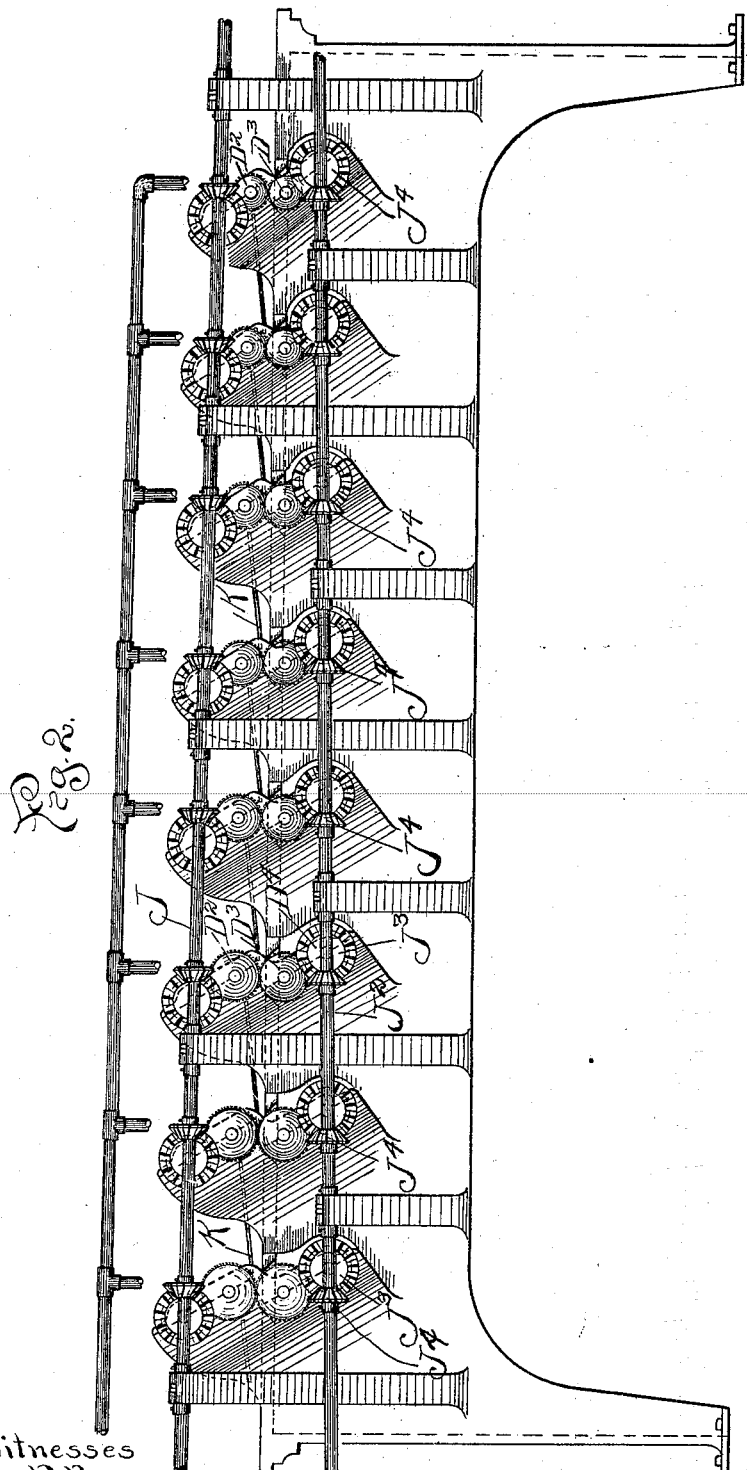

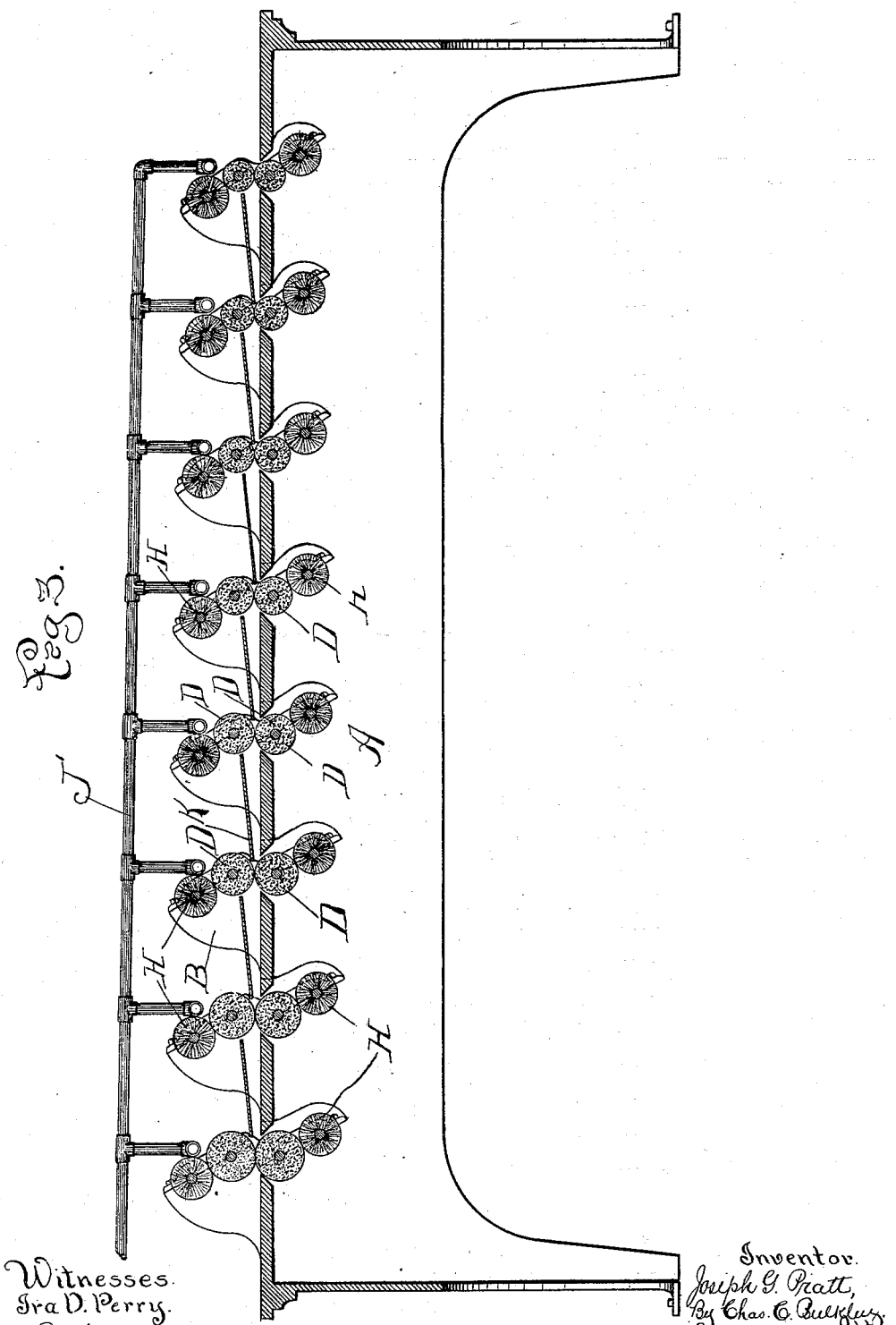

No. 637,824. Patented Nov. 28, 1899.
J. G. PRATT.
MACHINE FOR TREATING FIBROUS PLANTS.
(Application filed Oct. 14, 1898.)
(No Model.) 4 Sheets—Sheet 4.
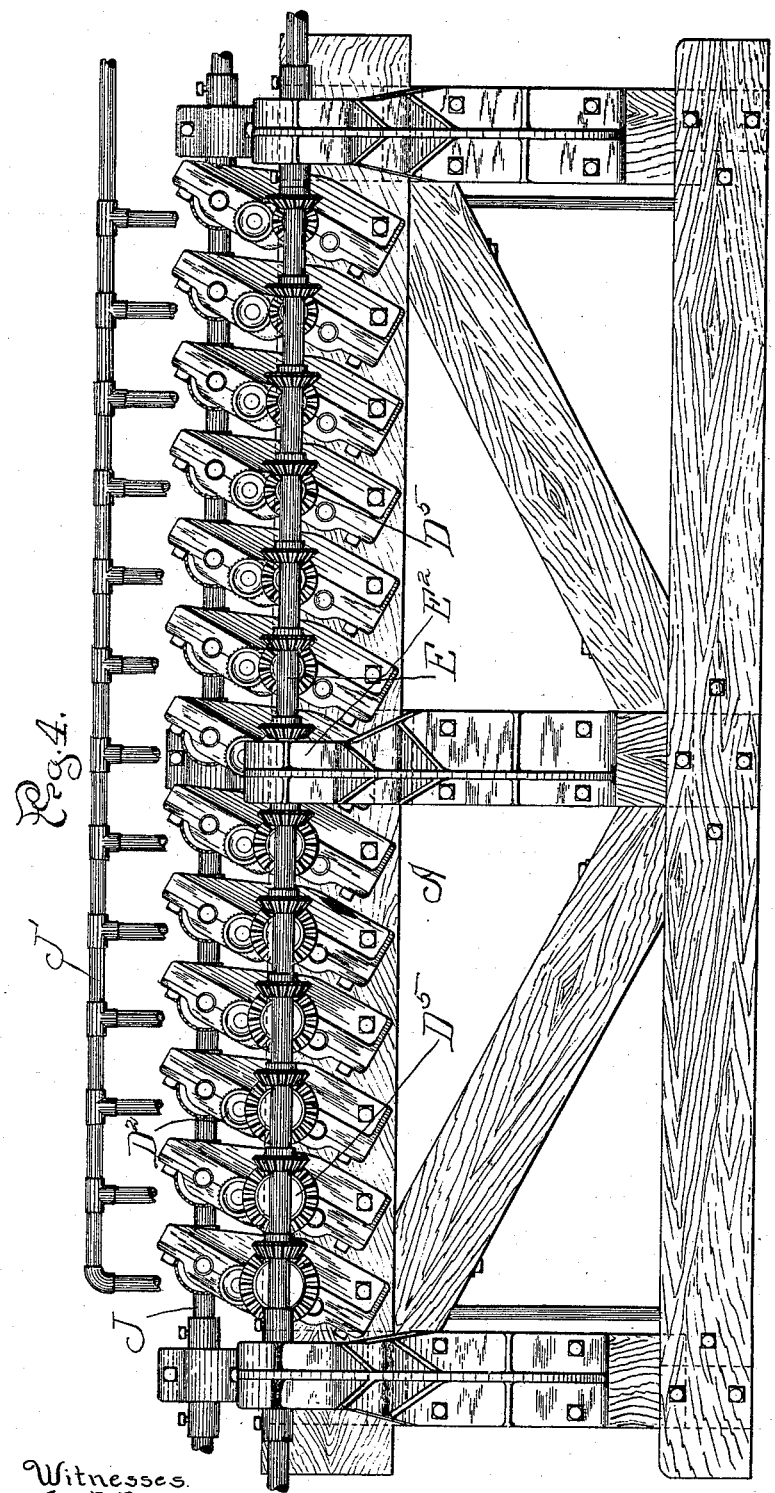
Witnesses.
Ira D. Perry.
R. Weir.
Inventor
Joseph G. Pratt,
By Chas. E. Buckley, Atty.

UNITED STATES PATENT OFFICE.

JOSEPH G. PRATT, OF CHICAGO, ILLINOIS.

MACHINE FOR TREATING FIBROUS PLANTS.

SPECIFICATION forming part of Letters Patent No. 637,824, dated November 28, 1899.

Application filed October 14, 1898. Serial No. 693,512. (No model.)

*To all whom it may concern:*

Be it known that I, JOSEPH G. PRATT, a citizen of the United States of America, and a resident of Chicago, Cook county, Illinois, have invented a certain new and useful Improved Machine for Treating Fibrous Plants, of which the following is a specification.

My invention relates to certain improvements in the means employed for cleaning off and stripping the skin or epidermis surrounding the fibers of ramie, jute, hemp, and other fibrous plants that grow upon single stalks and are of a fine and delicate nature. The fiber of such plants, which contain more or less gum or sap, lies between the outer covering or epidermis and the wood core of the stalks.

Heretofore these fibrous plants have been cleaned by a long and expensive process of retting in various ways and also by decorticating-machines, which strip, tear, and break the entire stalk, including the wooden-core portion, causing the product to be delivered from the machine having the fiber mingled with the crushed wood core in a tangled mass and with the skin only partially and incompletely removed, constituting a part of the tangled mass. This necessitates the treatment of this tangled mass with powerful chemicals in order to entirely separate the skin and gum or sap from the mass product. The crushing of the core, fiber, and the skin into a tangled mass renders it more difficult to separate the wood of the core from the fiber and to eliminate the gum or sap. As it is necessary also that the strands of the fiber product should be straight and separated from each other, reducing the fiber, skin, and wood core into a tangled mass defeats this object and renders it extremely difficult to disentangle the mass, separate the wood core and skin, and straighten out and separate the strands of the fiber. It is not possible with existing methods to avoid great waste, owing to the defective mode of operation of existing decorticating-machines.

The object of my invention is to provide a machine which shall more nearly conform to the natural methods in its effective action upon the plants and which shall therefore simply detach and more completely remove the skin from the fiber without crushing the wood core, a part of the skin, and the fiber into a tangled mass permeated with the gum or sap.

In my improved machine I simply subject the plant, with its skin softened by previous treatment, to the influence of a set of rolls having a progressive differential peripheral speed, which rolls seize upon the plants and in the progressive advance of the plants through the set of rolls subject them to a continued longitudinal pull, completely stripping and wiping the skin from the fiber, instead of breaking the wood core and crushing the fiber into the core and only partially removing the skin. With my improved machine the fiber is undetached from the core, and therefore it is retained in its natural position, with the strands straight, producing ultimately the complete removal of the skin, and the retention of the fiber in its natural position on the core also greatly facilitating the process of eliminating the gum or sap.

One of the features of my invention which materially coöperates to produce the desired results resides in the formation of a peculiar and particular character of yielding and compressible surface on the rolls whereby the stalks or plants are seized between yielding surfaces which conform to the size and shape of each plant or stalk and which prevent any crushing or breaking of the plants or stalks or dislodgment of the fiber from its natural position on the stalks as they are subjected to the differential action of the rolls, which strip and wipe the skin from the fiber.

My invention has certain other objects in view; and it consists in certain features about to be described, reference being now had to the accompanying drawings, in which—

Figure 1 is a side elevation of one type of my improved machine having rolls of progressively-increased diameter. Fig. 2 is a view of a side of the machine opposite to that shown in Fig. 1. Fig. 3 is a central longitudinal section. Fig. 4 is a side elevation of another type having progressively-decreasing gears to increase peripheral speed.

In carrying out my invention I provide two types of machine to obtain the differential peripheral speed of rollers whereby to act upon the stalks. In one type of machine I provide sets of rollers of progressively-increasing diameter and in the other provide rolls of the same diameter, but cause them in sets to relatively and progressively increase in speed.

It will be understood that the stalks before subjection to the action of the machine are treated in a bath of suitable chemicals, as is usual, to soften the fiber and skin.

I will now proceed to describe the character of machine having sets of rolls of relatively-increasing diameter. (Shown in Figs. 1 to 3 inclusive.) The mechanism is mounted upon a suitable supporting-table A, having cast therewith and projecting therefrom the bearing-plates B. Journaled in these bearing-plates are the sets of rollers or rolls D, arranged in pairs one above the other. These rolls, as is shown, are progressively in sets or pairs of relatively-increasing diameter. Each pair or set of the rolls D are driven at the same rate of speed, preferably, by means of the meshing gear-wheels $D^2$ and $D^3$, respectively on each roll, Fig. 2, and the lower rolls of the machine are driven by the bevel gear-wheels $D^4$, Fig. 1, meshing with the bevel-pinion $D^5$ of the drive-shaft E, which extends from end to end of the machine and is journaled in the boxes $E^2$. Brush-rolls H are located, respectively, above and below the wiping-rolls D, Fig. 3, and these brush-rolls are driven in a direction opposite to that of the wiping-rolls by means of the shafts J and $J^2$, Fig. 2, and the bevel gear-wheels $J^3$ and $J^4$, respectively on the brush-rolls and said shafts. These shafts also extend longitudinally alongside of and from end to end of the machine and are mounted in the boxes $J^5$. By reason of the relatively-increased diameter of the rolls it is necessary to extend the shafts J and $J^2$ so that they diverge gradually in relative position one from the other. If desired, apron-guards K may be provided to prevent the stalks from dislodgment in any way. In this type of machine it is evident that each respective set of rolls has what may be termed a "peripheral" speed, varying from that of its neighbors, and that this peripheral variation of speed increases progressively from one end of the machine to the other. When the stalks are fed between the first set of rolls and their advancing ends seized by the next set of rolls having a relatively-increased peripheral speed, the difference of speed between the two sets imparts to the stalks a pull which tends to wipe or strip the epidermis from the fiber. The wiping-rolls D are faced with a covering of what is generally known as a "sponge-rubber," as at L, Fig. 4, a product of manufacture which is exceedingly pliable and yielding and which will yet retain a firm grip and seizure upon the stalk. I have discovered that this sponge-rubber will permit the use of rolls to strip and wipe off the epidermis and that it will overcome the crushing of the stalks and the tangling together of the skin incompletely removed, the fiber, and the crushed stalk. The rolls so faced yield to the several stalks and in yielding obtain and maintain a firm hold upon the stalks to subject them to the influence of the differential peripheral speed of the rolls as the stalks are drawn through the rolls and at each set subjected progressively to a pull which tends to wipe and strip the epidermis from the fiber. By this means the fiber is separated readily from the epidermis and retains its natural straight position upon the stalks, thus preventing the tangling together of the separate lengths of fiber and presenting the fiber in a straight position on the core or stem for subsequent treatment.

The other form of machine, which is illustrated in Fig. 4, is of the same general construction, except that the rolls D are all of the same diameter, the peripheral speed between the sets of rolls being relatively and progressively increased by progressively decreasing the size of the gear-wheel $D^5$ of each set, thereby rotating the rolls at a relatively and progressively increased speed.

I provide means for delivering upon the stalks as they are advanced through the machine a supply of water through the feed and delivery pipes $J'$.

Having thus described my invention, what I claim as new therein, and desire to secure by Letters Patent, is—

In an apparatus for treating the stalks of fibrous plants, sets of rolls having a peripheral covering of sponge-rubber, arranged to act upon said stalks and means for imparting to said sets of rolls a relatively and progressively increasing peripheral speed whereby the stalks are subjected to the differential of movement between said sets to strip or wipe the epidermis from the fiber.

Signed at Chicago, Cook county, Illinois, this 12th day of October, 1898.

JOSEPH G. PRATT.

Witnesses:
CHAS. C. BULKLEY,
A. MILLER BELFIELD.